United States Patent
Chakraborty et al.

(10) Patent No.: US 9,628,485 B2
(45) Date of Patent: Apr. 18, 2017

(54) FACILITATING PEERING BETWEEN DEVICES IN WIRELESS COMMUNICATION NETWORKS

(71) Applicant: AT&T Intellectual Property I, L.P., Atlanta, GA (US)

(72) Inventors: Soumyajit Chakraborty, Harrison, NJ (US); Shiv Kumar, Marlboro, NJ (US); James Gordon Beattie, Jr., Bergenfield, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 92 days.

(21) Appl. No.: 14/471,337

(22) Filed: Aug. 28, 2014

(65) Prior Publication Data
US 2016/0066355 A1    Mar. 3, 2016

(51) Int. Cl.
*H04L 29/06* (2006.01)
*H04W 76/02* (2009.01)
(Continued)

(52) U.S. Cl.
CPC ............. *H04L 63/10* (2013.01); *H04W 4/206* (2013.01); *H04W 12/06* (2013.01); *H04W 76/023* (2013.01); *H04W 4/046* (2013.01)

(58) Field of Classification Search
CPC ...... H04W 12/06; H04W 76/023; H04L 63/10
(Continued)

(56) References Cited

U.S. PATENT DOCUMENTS 7,036,382 B2 * 5/2006 Sherman ............. G01L 19/0672
                                                          73/715
8,385,269 B2   2/2013 Haddad
(Continued)

FOREIGN PATENT DOCUMENTS

GB        2507546 A      5/2014
WO    2013112953 A1      8/2013
(Continued)

OTHER PUBLICATIONS

Campo, et al. "PDP: A lightweight discovery protocol for local-scope interactions in wireless ad hoc networks." Computer Networks 50.17 (2006): 3264-3283. Last accessed Jul. 4, 2014.
(Continued)

*Primary Examiner* — Hadi Armouche
*Assistant Examiner* — Shahriar Zarrineh
(74) *Attorney, Agent, or Firm* — Amin, Turocy & Watson, LLP

(57) ABSTRACT

Peering within a mobile network is facilitated. In one example, a method includes: generating, by a requesting device including a processor, a peer group between the requesting device and at least one target device over a wireless communication network. The method also includes obtaining virtual access, by the requesting device, to an aspect of the target device based on the generating, wherein the generating is based on successful authentication of the requesting device and the target device. The method also includes displaying, by the requesting device, information indicative of the aspect of the service to which the target device is subscribed. In some cases, the aspect of the target device includes a service to which the target device is subscribed. The service can share data retrieved at a location of the target device with the requesting device.

17 Claims, 11 Drawing Sheets

(51) Int. Cl.
  *H04W 12/06* (2009.01)
  *H04W 4/20* (2009.01)
  *H04W 4/04* (2009.01)

(58) Field of Classification Search
  USPC .............................................................. 726/3
  See application file for complete search history.

(56) References Cited

U.S. PATENT DOCUMENTS

| | | | |
|---|---|---|---|
| 8,493,887 B2 | 7/2013 | Palanki et al. | |
| 8,577,355 B1 | 11/2013 | Shaw | |
| 8,613,070 B1* | 12/2013 | Borzycki | G06F 21/6218 726/8 |
| 9,042,235 B1* | 5/2015 | Kemmerer, Jr. | H04W 40/12 370/238 |
| 9,049,344 B2* | 6/2015 | Savoor | H04N 7/1675 |
| 2002/0062403 A1* | 5/2002 | Burnett | G06Q 10/10 709/204 |
| 2003/0050959 A1* | 3/2003 | Faybishenko | G06F 17/30867 709/202 |
| 2003/0163702 A1* | 8/2003 | Vigue | G06F 17/30206 713/176 |
| 2004/0030794 A1* | 2/2004 | Hugly | H04L 63/02 709/230 |
| 2004/0180668 A1* | 9/2004 | Owens | B60R 25/102 455/456.1 |
| 2004/0249888 A1* | 12/2004 | Berkey | H04L 29/08846 709/204 |
| 2007/0199076 A1* | 8/2007 | Rensin | H04L 29/06027 726/27 |
| 2008/0059635 A1* | 3/2008 | Seiferth | H04L 12/2876 709/226 |
| 2008/0200168 A1* | 8/2008 | Jiang | H04L 67/1093 455/432.1 |
| 2009/0037529 A1* | 2/2009 | Armon-Kest | G06Q 10/10 709/204 |
| 2009/0103481 A1* | 4/2009 | Mahajan | H04L 12/66 370/329 |
| 2009/0157893 A1* | 6/2009 | Lazar | H04N 21/4126 709/231 |
| 2009/0161592 A1* | 6/2009 | So | H04W 76/02 370/312 |
| 2009/0310570 A1* | 12/2009 | Smith | H04W 76/023 370/335 |
| 2010/0093342 A1 | 4/2010 | Ramachandra Rao | H04M 15/00 455/432.1 |
| 2010/0312851 A1* | 12/2010 | Jackson | H04L 67/104 709/217 |
| 2011/0022970 A1* | 1/2011 | Sobol | G06F 3/04815 715/757 |
| 2011/0055403 A1* | 3/2011 | Balachandran | H04L 65/4076 709/227 |
| 2011/0103317 A1 | 5/2011 | Ribeiro et al. | |
| 2011/0126132 A1* | 5/2011 | Anderson | G06Q 10/10 715/758 |
| 2011/0243553 A1* | 10/2011 | Russell | G06Q 30/0631 398/25 |
| 2011/0258313 A1 | 10/2011 | Mallik et al. | |
| 2011/0294474 A1 | 12/2011 | Barany et al. | |
| 2011/0319142 A1* | 12/2011 | Chen | H04M 1/6058 455/569.1 |
| 2012/0011247 A1 | 1/2012 | Mallik et al. | |
| 2012/0093098 A1 | 4/2012 | Charbit et al. | |
| 2012/0120885 A1 | 5/2012 | Wang et al. | |
| 2012/0140624 A1* | 6/2012 | Denman | H04L 41/0816 370/230.1 |
| 2012/0163235 A1 | 6/2012 | Ho et al. | |
| 2012/0190386 A1* | 7/2012 | Anderson | G01C 15/04 455/456.3 |
| 2012/0243437 A1 | 9/2012 | Horn et al. | |
| 2012/0255505 A1* | 10/2012 | Gauthier | A01K 15/023 119/721 |
| 2012/0303978 A1* | 11/2012 | Chen | G06F 3/147 713/300 |
| 2013/0148526 A1* | 6/2013 | Hwang | H04W 4/08 370/252 |
| 2013/0198804 A1* | 8/2013 | Asher | H04L 29/06 726/3 |
| 2013/0227647 A1* | 8/2013 | Thomas | H04L 63/0823 726/3 |
| 2013/0317892 A1* | 11/2013 | Heerboth | G06Q 30/0241 705/14.4 |
| 2013/0325700 A1* | 12/2013 | Chakraborty | H04W 12/08 705/39 |
| 2014/0016484 A1 | 1/2014 | Skjegstad et al. | |
| 2014/0022986 A1 | 1/2014 | Wu et al. | |
| 2014/0064147 A1 | 3/2014 | Wang et al. | |
| 2014/0092885 A1 | 4/2014 | Venkatachalam et al. | |
| 2014/0105083 A1 | 4/2014 | Krishnaswamy et al. | |
| 2014/0126432 A1 | 5/2014 | Wang et al. | |
| 2015/0271331 A1* | 9/2015 | Segre | H04M 3/5232 379/265.09 |

FOREIGN PATENT DOCUMENTS

| | | |
|---|---|---|
| WO | 2013116344 A1 | 8/2013 |
| WO | 2013169974 A1 | 11/2013 |
| WO | 2013189078 A1 | 12/2013 |
| WO | 2014000161 A1 | 1/2014 |
| WO | 2014018629 A1 | 1/2014 |
| WO | 2014070434 A1 | 5/2014 |

OTHER PUBLICATIONS

Doppler, et al. "Device-to-device communication as an underlay to LTE-advanced networks." Communications Magazine, IEEE 47.12 (2009): 42-49. Last accessed Jul. 4, 2014.

Hsieh, et al. "On Using Peer-to-Peer Communication in Cellular Wireless Data Networks," IEEE Trans. Mobile Comp., 2004, pp. 57-72, vol. 3, No. 1. Last accessed Jul. 4, 2014.

Zulhasnine, et al. "Efficient resource allocation for device-to-device communication underlaying LTE network." Wireless and Mobile Computing, Networking and Communications (WiMob), 2010 IEEE 6th International Conference on. IEEE, 2010. Last accessed Jul. 4, 2014.

Lei, et al. "Operator controlled device-to-device communications in LTE advanced networks." IEEE Wireless Communications 19.3 (2012): 96. Last accessed Jul. 4, 2014.

Zheng, et al. "Radio resource allocation in LTE-advanced cellular networks with M2M communications." Communications Magazine, IEEE 50.7 (2012): 184-192. Last accessed Jul. 4, 2014.

Astely, et al. "LTE release 12 and beyond [accepted from open call]." Communications Magazine, IEEE 51.7 (2013). Last accessed Jul. 4, 2014.

* cited by examiner

FACILITATING PEERING BETWEEN DEVICES IN WIRELESS COMMUNICATION NETWORKS

TECHNICAL FIELD

The subject disclosure relates generally to wireless communication, and, for example, to facilitating peering between devices in wireless communication networks.

DETAILED DESCRIPTION

Figure 1:
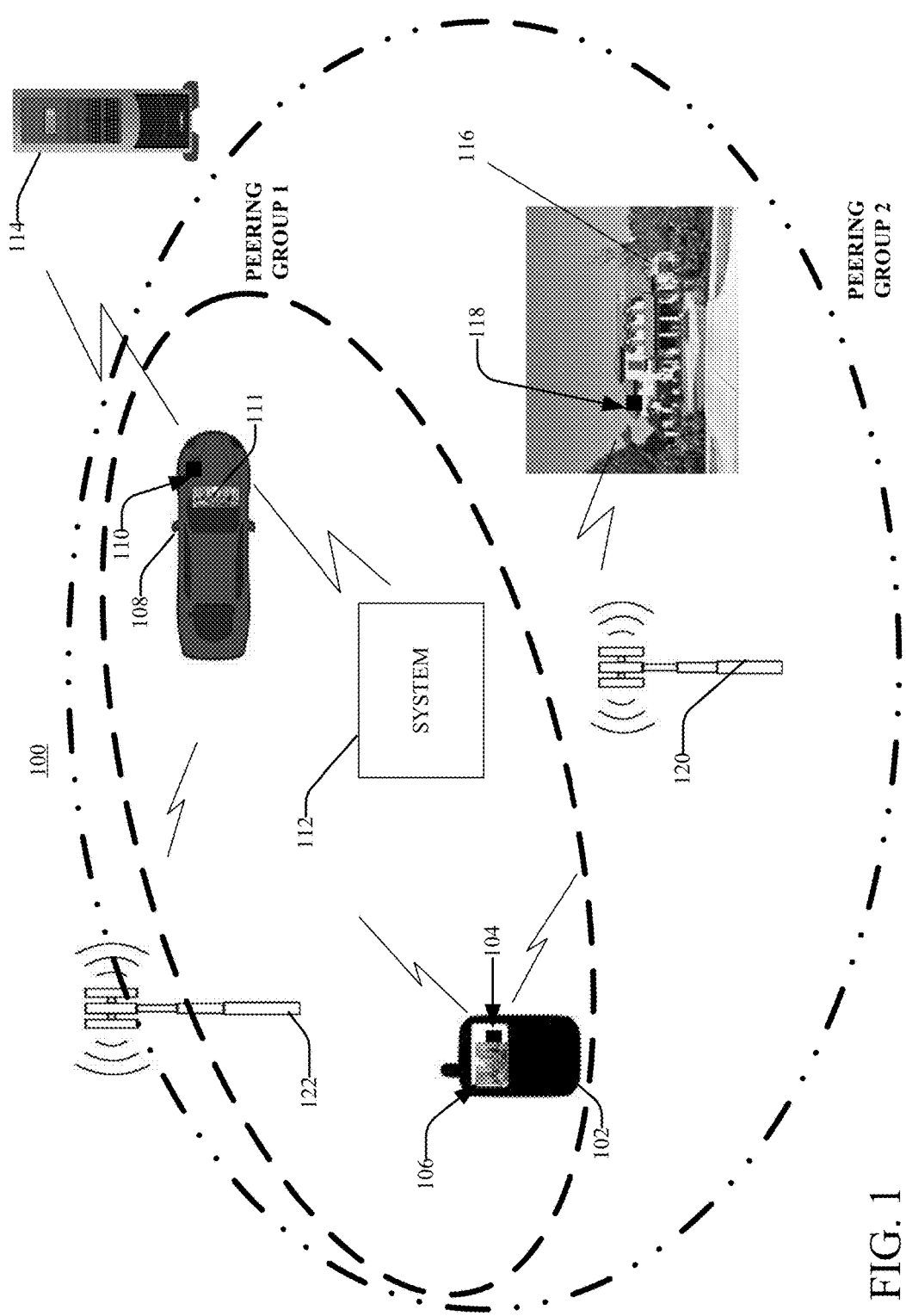
FIG. 1 illustrates an example block diagram of a system facilitating peering between devices in wireless communication networks in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

In today's society, a high premium is placed on the ability to obtain services and/or information in an efficient and timely manner. However, devices connected to a wireless communication network may or may not have access to various services or information for any number of reasons. The user of the device may not be subscribed to a service, for example. As another example, a service may not be available or offered in a location in which the device is operating. As another example, the user of a device may want to minimize subscriptions to reduce costs. As another example, the user of a device may want to try the service as a trial prior to commitment to purchase. However, notwithstanding such, there is an ongoing interest in immediate and efficient access to information and/or services (e.g., infotainment), and the market for providing these capabilities is ever present and growing.

Embodiments described herein include systems, methods, apparatus and/or computer-readable storage media facilitating peering between two or more devices. The term "peering" refers to the connection or grouping between two or more devices communicatively coupled to one another over a wireless communication network for the exchange of information (e.g., shared screen information) and/or services (e.g., Internet service, navigation service, services providing monitoring and/or control of one or more aspects or areas within a home or other environment) between the two or more devices over the wireless communication network. In one embodiment, a method includes: mapping, by a system including a processor, subscription information associated with devices having a defined peering characteristic; and authenticating, by the system, a requesting device of the devices to enable the requesting device to utilize an aspect of a target device of the devices. The method also includes facilitating, by the system, virtual access, at the requesting device, of the aspect of the target device.

In another embodiment, another method includes generating, by a requesting device comprising a processor, a peer group between the requesting device and at least one target device over a wireless communication network. As used herein, a "peer" group refers to a group of devices that are or are identified to be communicatively coupled to one another over a wireless communication network for the exchange of information (e.g., shared screen information) and/or services between two or more of the devices within the peer group. The method also includes obtaining virtual access, by the requesting device, to an aspect of the target device based on the generating, wherein the generating is based on successful authentication of the requesting device and the target device.

In another embodiment, a computer-readable storage device is provided. The computer-readable storage device stores computer-executable instructions that, in response to execution, cause a requesting device comprising a processor to perform operations. The operations include: generating a peer-to-peer communication path between the requesting device and at least one target device; and obtaining virtual access to an aspect of the target device based on the generating, wherein the generating is based on successful authentication of the requesting device and the target device.

One or more embodiments can advantageously facilitate temporarily sharing and/or borrowing services between two or more devices that are remote from one another. For example, sharing and/or borrowing services between remote vehicle temporarily and provide seamless access between the vehicles at anytime and at any location at which wireless connectivity exists. Other advantages include facilitating remote troubleshooting or content access needs. From the service access perspective, one or more embodiments described herein can provide connected car users with uninterrupted access to services on demand. In some embodiments, a system can provide a requesting device with the capability to share and/or control of one or more display screens at a target device. As such, one or more embodiments can provide peer-to-peer capability on vehicles to share vehicle data to peers in session irrespective of cellular carrier with which the different vehicles are associated. As such, different vehicles with different cellular carriers can share a peering session and thereby share services and/or share screens with one another. In various embodiments, a device can peer to a connected home or any other wireless device.

FIG. 1 illustrates an example block diagram of a system facilitating peering between devices in wireless communication networks in accordance with one or more embodiments described herein. System 100 includes requesting device 102, one or more of target devices 108, 116, system 112, one or more BSs 120, 122, and server 100. In various embodiments, one or more of requesting device 102, one or more of target devices 108, 116, system 112, one or more BSs 120, 122, and server 100 can be electrically and/or communicatively coupled to one another to perform one or more of the functions of system 100.

As shown in FIG. 1, requesting device 102 can include output device 106 and/or peering device 104, target 108 can include output device 111 and/or peering device 110. Although not shown, in various embodiments, target device 116 can include an output device (not shown) and/or a peering device 104. Output devices 106, 111 can be configured to output information received at or transmitted from requesting device 102 and target devices 108, 116. For example, output devices 106, 111 can include structure and/or functionality for outputting and/or displaying images, animation, audio or any other information retrieved at or transmitted from requesting device 102 and/or target devices 108, 116. In some embodiments, output devices 106, 111 are display devices configured to display text, images and/or animation. In some embodiments, output devices 106, 111 can also output audio.

Peering devices 104, 110 are configured with structure and/or functionality to request, accept and/or participate in a peering session between requesting device 102 and one or more of target devices 108, 116. As shown in FIG. 1, requesting device 102 can be in a peer group with target device 108. Alternatively, requesting device 102 can be in a peer group with target devices 108, 116.

In either embodiment, any number of additional devices can be added to the peer group such that requesting device 102 and/or one or more of target devices 108, 116 can be peered with another device, for example. Any number of different peering groups can be formed and the groups can be one-to-one, one-to-many or many-to-many in various embodiments.

Further, any device can perform the role of a device that initiates a peer group (e.g., a requesting device) or a device from which services or screen information is shared (e.g., a target device). Additionally, in some embodiments, a device can be a requesting device within one peer group and a target device within another peer group, and the two peer groups may operate concurrently, simultaneously or over distinct, non-overlapping time periods.

One or more of requesting device 102 and/or target devices 108, 116 can be mobile or stationary devices. For example, requesting device 102 can be a cellular telephone and/or one or more of target devices 108, 116 can be connected cars. As another example, both requesting device 102 and/or one or more of target devices 108, 116 can be cellular telephones. As another example, any number of types of devices communicatively coupleable to a wireless communication network can be employed as requesting device 102 and/or one or more of target devices 108, 116.

In some embodiments, requesting device 102 and/or one or more of target devices 108, 116 can be located in the same or different regions of the world including, but not limited to, being located on different continents while being communicatively coupleable to one another via the wireless communication network formed via structures such as BSs 120, 122. As such, embodiments described herein can be facilitated based on connectivity to a wireless communication network regardless of whether the particular type of communication network is the same type or different types across the devices. For example, content intended for display on a output device (e.g., display screen) of the target device can be displayed on a screen of the requesting device. The information can be retrieved from the location of the target device in some instances, for example, if the target device is a camera or is operably coupled to a camera to enable the target device to receive and/or display information captured by the camera. The information retrieved at the target device can be shared with the requesting device.

In particular, to establish a peer group, system 112 can receive, from requesting device 102, a request to establish a peer group with one or more of target devices 108, 116. The request can specify the identity of a target device of interest in some embodiments. For example, a user of requesting device 102 may know the identification information for another device owned by the user of requesting device 102 (or otherwise known to the user of requesting device 102) and the user of requesting device 102 may desire access to services to which the target device is subscribed. However, in some embodiments, the request can merely specify information and/or services that requesting device 102 would like to access. In either case, system 112 can identify one or more target devices for inclusion in a peer group with requesting device 102 in response to the request from requesting device.

System 112 can determine whether requesting device 102 and one or more of target devices 108, 116 have authorization to access peering service over the wireless communication network and/or can facilitate establishment of a peering group after confirming requesting device 102 and one or more of target devices 108, 116 are authorized to access the peering service and are authenticated. A peering session can then be established over the wireless communication network and information at or services to which one or more of target devices 108, 116 are subscribed can be accessed by requesting device 102.

While BSs 120, 122 are shown in FIG. 1, the structures are merely indicative of the structure and/or functionality present in the wireless communication network for facilitating wireless communication between requesting device 102 and one or more of target devices 108, 116. In various embodiments, the structures can be those provided by different technologies (e.g., LTE, GSM) for facilitating communication and corresponding peering between requesting device 102 and one or more of target devices 108, 116 over the network.

In various embodiments, the wireless communication network over which requesting device 102 and one or more of target devices 108, 116 form a peer group can be a homogeneous network composed of a single technology type (e.g., LTE network) or a heterogeneous network composed of any number of different technologies (e.g., a combination of an LTE network communicatively coupled to a GSM network). Accordingly, system 100 facilitates communication between requesting device 102 and target devices 108, 116 whether requesting device 102 and/or target devices 108, 116 have the same technology (e.g., both LTE devices communicating over an LTE network) or different technology types (e.g., requesting device 102 is an LTE device and target device 108 is a GSM device).

In some embodiments, as shown, system 100 can also include server 114 configured to facilitate the provisioning of one or more different types of applications (e.g., navigation, Internet, applications for control of home environment) to which one or more target devices 108, 116 is subscribed.

Figure 2:
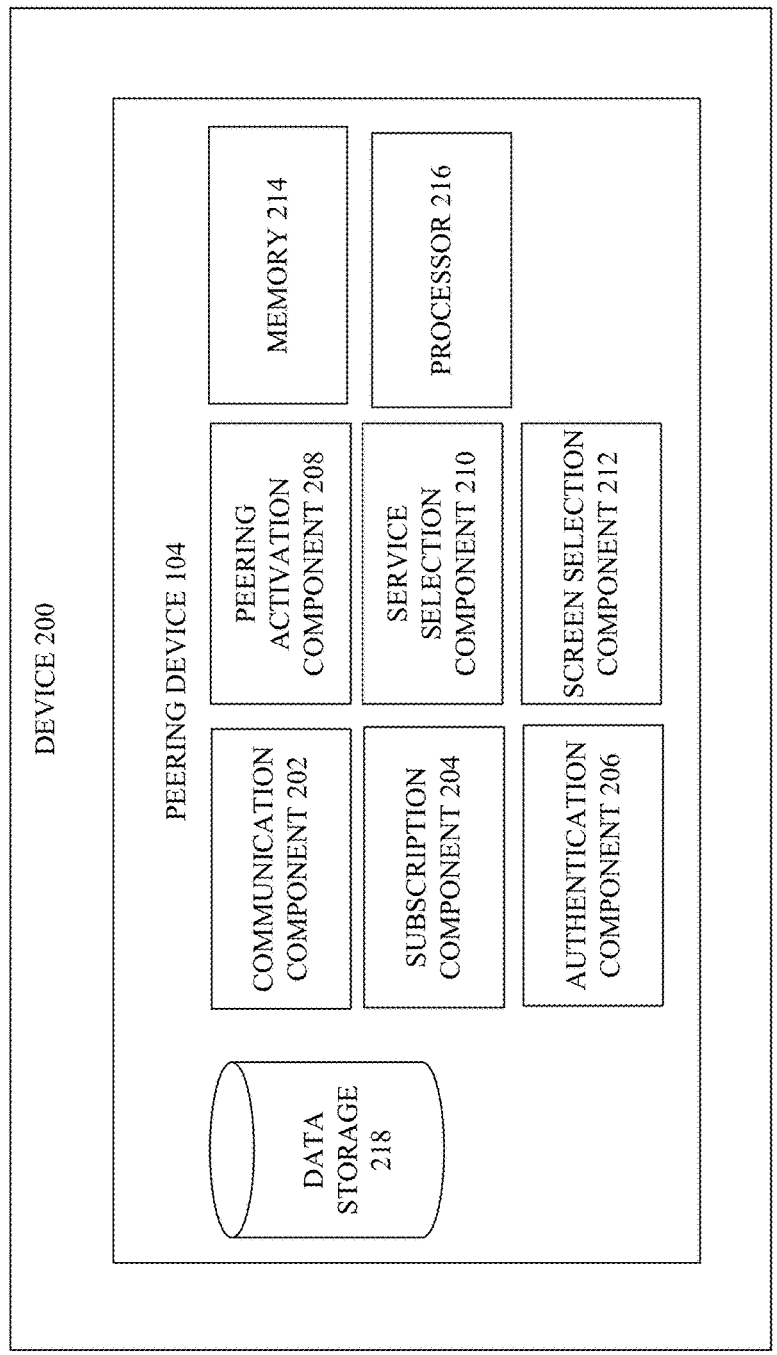
FIG. 2 illustrates an example block diagram of a device for which peering can be facilitated in accordance with one or more embodiments described herein.
Figure 3:
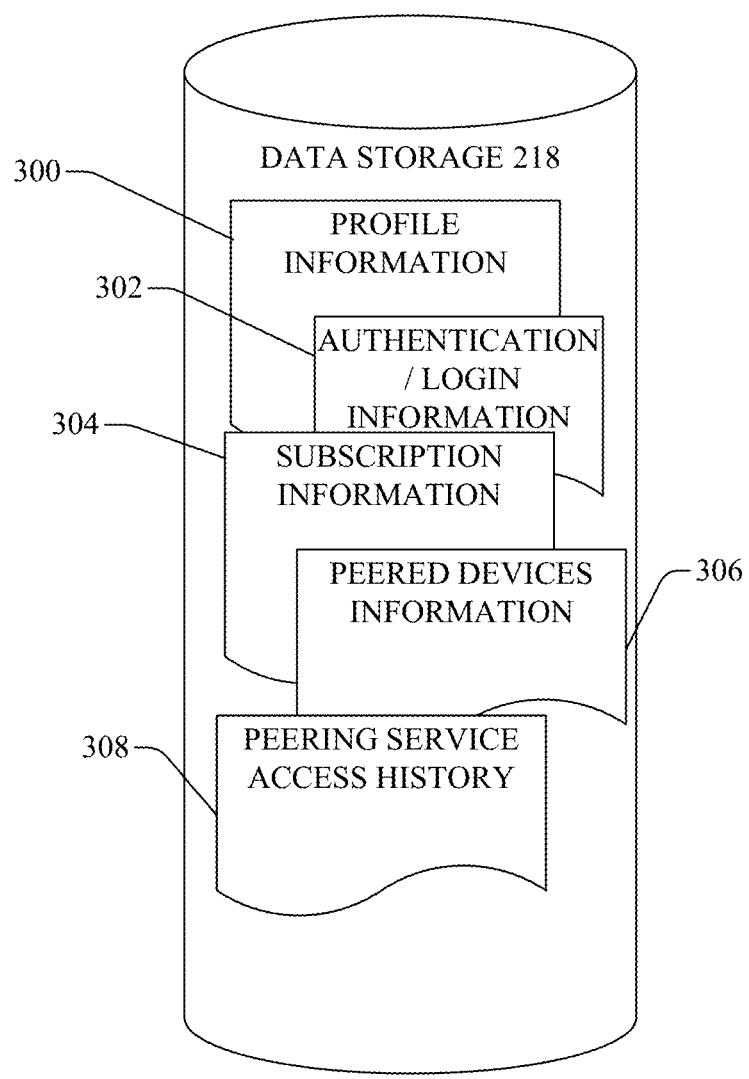
FIG. 3 illustrates an example block diagram of data storage of the device of FIG. 2 in accordance with one or more embodiments described herein.
Figure 4:
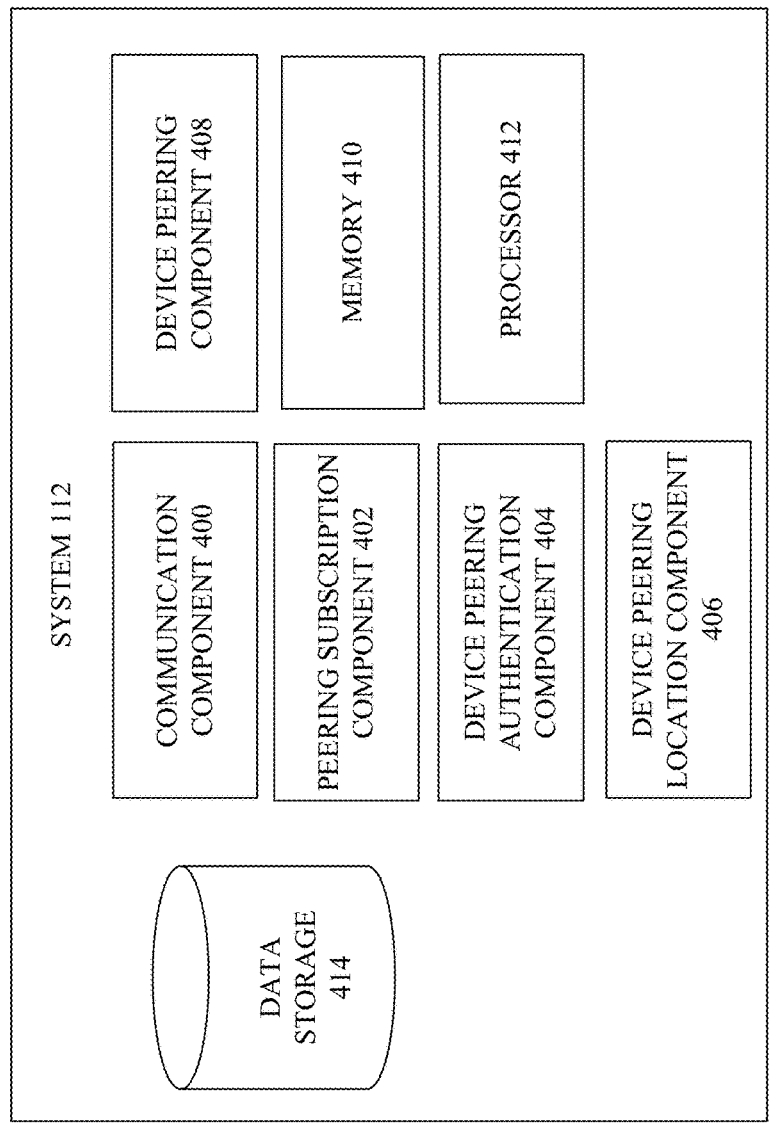
FIG. 4 illustrates an example block diagram of a system that facilitates peering between devices in wireless communication networks in accordance with one or more embodiments described herein.

Operations of system 100 will be explained in greater detail with reference to FIGS. 1, 2, 3 and 4. FIG. 2 illustrates an example block diagram of a device for which peering can be facilitated in accordance with one or more embodiments described herein. FIG. 3 illustrates an example block diagram of data storage of the device of FIG. 2 in accordance with one or more embodiments described herein. FIG. 4 illustrates an example block diagram of a system that facilitates peering between devices in wireless communication networks in accordance with one or more embodiments described herein. Repetitive description of like elements employed in other embodiments described herein is omitted for sake of brevity.

With reference to FIGS. 1 and 2, device 200 includes peering device 104. While peering device 104 is associated with requesting device 102 in FIG. 1, in other embodiments, peering device 110, which is associated with target device 108, can include the structure and/or functionality of peering device 104. Any device can serve as a requesting device, and initiate a peering session, or as a target device.

As shown in FIG. 2, peering device 104 includes communication component 202, subscription component 204, authentication component 206, peering activation component 208, service selection component 210, screen selection component 212, memory 214, processor 216 and/or data storage 218. In various embodiments, one or more of communication component 202, subscription component 204, authentication component 206, peering activation component 208, service selection component 210, screen selection component 212, memory 214, processor 216 and/or data storage 218 can be electrically and/or communicatively coupled to one another to perform one or more functions of peering device 104.

Communication component 202 can transmit and/or receive information from and/or to device 200. For example, the information can be audio, video, text, images, animation or the like. In one embodiment, communication component 202 can transmit a request to peer with another device. In some embodiments, communication component 202 can receive information for peering with one or more other devices. Communication component 202 can also transmit information representative of services or other information shared or utilized from other devices (e.g., target device 108) with which device 200 is peered. Similarly, communication component 202 can transmit information that device 200 may be sharing with a requesting device (e.g., requesting device 102). In some embodiments, communication component 200 can also transmit remote login and/or other information employed for authentication of device 200 and/or enabling system 112 to determine whether device 200 is authorized to utilize peering services over the wireless communication network.

Subscription component 204 can generate information and/or payment for establishing or continuing a subscription to the peering service. Subscriptions can be fee-based and can be associated with one or more different devices. As such, a subscription can be a multi-device subscription allowing multiple devices to participate in peering sessions and/or may be for a single device.

In some embodiments, subscription component 204 can also generate information specifying details regarding one or more subscriptions for a peering service. For example, subscription component 204 can generate information and/or allow for selection of different details of the desired subscription. For example, details can include, but are not limited to, the time period for the subscription, type of services to which peering device will have access, the number of peering sessions authorized for a particular time period, type of information to which peering device will have access, whether the device will have access to peering sessions only during selected times of day, month or year or the any number of other options that a user may prefer with regard to any particular type of subscription-based service.

Authentication component 206 can generate information that can be transmitted to the system 112 to enable device 200 to peer with another device. Authentication component 206 can store and/or access the authentication information. In one embodiment, the authentication component 206 transmits to system 112 an Internet Protocol (IP) address and/or identifier for device 200 (and any other devices associated with the subscription selected by subscription component 204). System 112 can cross-reference such information with a database in which currently-subscribed devices are included in order to determine whether device 200, for example, can be authenticated and thereby provided access to the peering service.

Peering activation component 208 can generate a signal that causes peering to be turned on or off at a device. If peering is turned off, device 200 is not accessible for establishing a peering session, and device 200 cannot initiate a peering session. As such, a user of device 200 can control the times when device 200 is available for peering. In some embodiments, when peering is turned off, device 200 is not visible to system 112 as a device that can be selected for peering.

If peering is turned on, and device 200 is acting as a requesting device, peering activation component 208 generates a signal to establish a communication path between device 200 and a target device identified by system 112. If peering is turned on, and device 200 is acting as a target device, peering activation component 208 generates a signal to allow a requesting device to access services to which the target device is subscribed and/or information from an output device at the target device (e.g., shared screen information).

Figure 5:
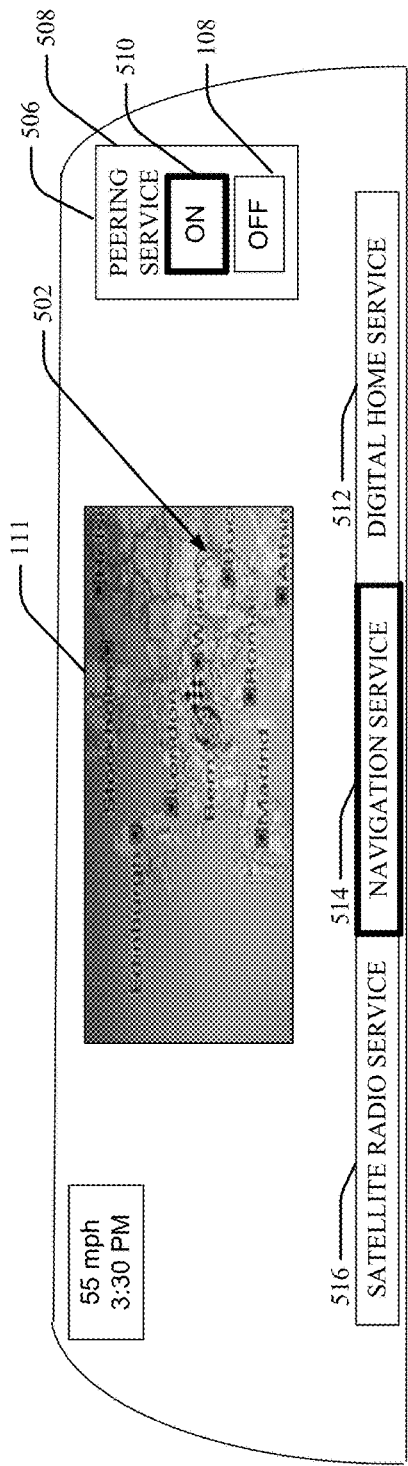
FIGS. 5 and 6 illustrate example diagrams of devices within a peering group and virtual access of a defined service facilitated via peering between devices in wireless communication networks in accordance with one or more embodiments described herein.
Figure 6:
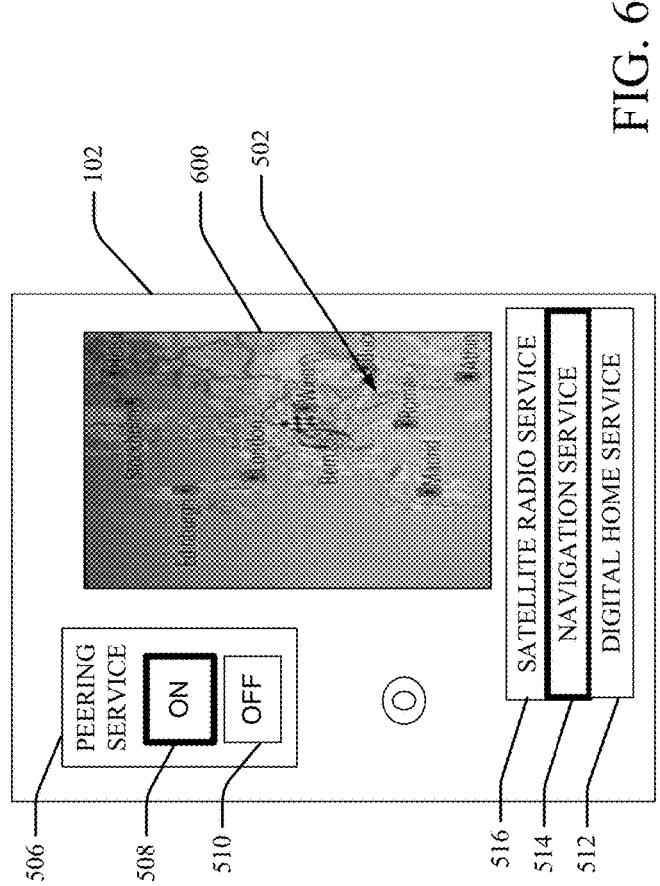

Service selection component 210 can generate a signal to select one or more different services to virtually access as a requesting device or to allow another device to access as a target device. The operation of the service selection component 210 will be provided in more detail with reference to FIGS. 5 and 6. FIGS. 5 and 6 illustrate example diagrams of devices within a peering group and virtual access of a defined service facilitated via peering between devices in wireless communication networks in accordance with one or more embodiments described herein. Repetitive description of like elements employed in other embodiments described herein is omitted for sake of brevity.

In the embodiment shown, FIG. 5 illustrates output device 111 of target device 108, for example. FIG. 5 shows a target device and FIG. 6 shows a corresponding requesting device (e.g., requesting device 102) virtually accessing services to which target device 108 is subscribed.

As shown, target device 108 includes a component for turning peering on or off, such as peering activation component 208 of FIG. 2. As shown, peering activation component 208 can cause display 506 to be provided on output device 111 and can include two buttons or other aspects that can be activated to allow a user to turn peering service on or off. In embodiments in which output device 111 is a touch screen display device, first display region 508 can be toggled or otherwise activated to turn peering on and thereby make target device 108 available and/or visible for selection for peering by system 112. While output device 111 is depicted as a touch screen display device, in other embodiments, any number of different components can be employed for output device 111 and/or for activating and/or de-activating peering accessibility for target device 108. By way of example, but not limitation, a knob, activatable area of a touch screen or any other components that can be manipulated for turning peering on/off can be employed.

As shown, target device 108 also includes functionality for selection of a service that can be accessed by a requesting device. For example, target device 108 can include a device such as service selection component 210 that allows a target device to select services. In these embodiments, target device can turn on one or more different services that can be accessed at any particular time. In some embodiments, all of the services to which target device 108 is subscribed are accessible by a requesting device. In other embodiments, such as that shown, only services that are activated at the target device 108 can be accessed by a requesting device.

Shown in FIG. 5 is activation of the navigation service 514. Other services to which target device 108 has a subscription that can be accessed, if activated, include satellite radio service 516 and/or digital home service 512. Any number of different services that may not be shown in FIG. 5 and to which target device 108 is subscribed can be accessed in various embodiments.

Shown in FIG. 6 is requesting device 102. Requesting device 102 has requested peering with target device 108 and access to navigation service 514 to which target device 108 is subscribed. For example, service selection component 210 of FIG. 2 can be provided at requesting device 102 and allow requesting device 102 to request a particular service from target device 108.

In some embodiments, after authentication of target device 108 and requesting device 102, the navigation service indicated by selection of navigation service component 514 can be virtually accessed by requesting device 102. In the embodiment shown, the navigation service is displayed on the output device 111 of target device 108 in addition to being displayed on the output device 106 of requesting device 102. However, in other embodiments, the navigation service need not be displayed on output device 111 and may be displayed only on and virtually accessed by requesting device 102. In some embodiments, target device 108 can access the navigation service from server 114 and requesting device 102 can access the navigation service via the access provided by target device 108.

As shown, requesting device 102 is a smart phone while target device 108 is a connected vehicle, and FIG. 5 displays the display region within the dashboard of the connected car. As described, any one of the requesting device 102 and/or the target device 108 can be mobile or stationary and/or coupled to one or more different wireless networks. For example, target device 108 can be coupled to an LTE wireless network while requesting device 102 can be coupled to a GSM wireless network.

Turning back to FIG. 2, screen selection component 212 can generate a signal that allows selection of shared screen mode for causing shared screen information to be displayed on an output device of a requesting device with which a target device is peered.

Figure 7:
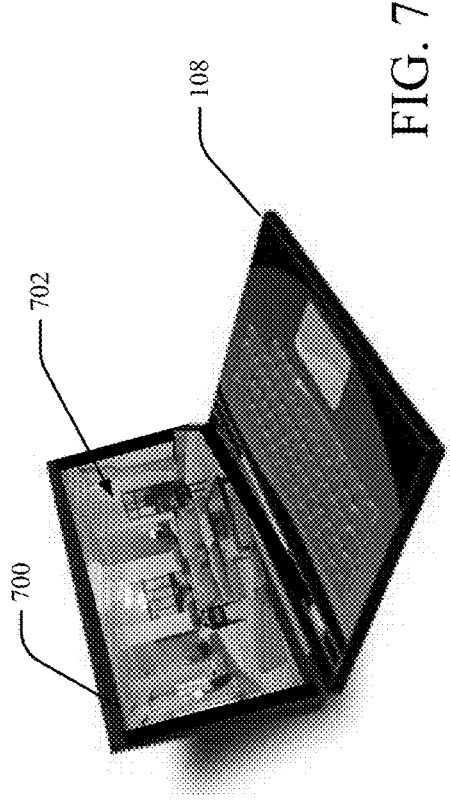
FIGS. 7 and 8 illustrate example diagrams of devices within a peering group and virtual access of a shared screen facilitated via peering between devices in wireless communication networks in accordance with one or more embodiments described herein.
Figure 8:
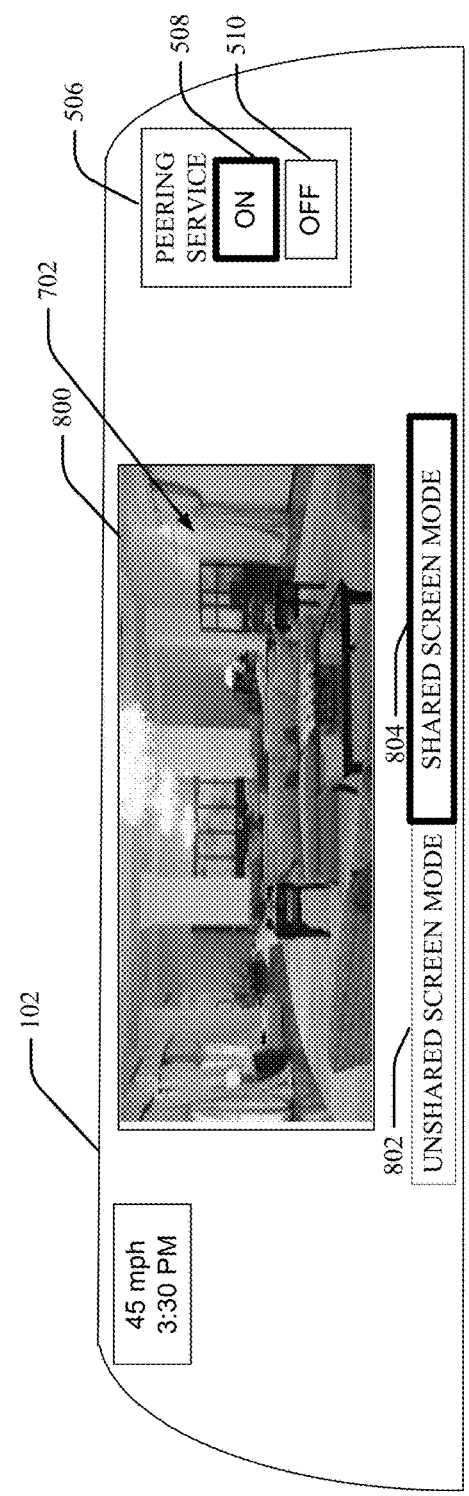

The operation of screen selection component 212 will be provided in more detail with reference to FIGS. 7 and 8. FIGS. 7 and 8 illustrate example diagrams of devices within a peering group and virtual access of a shared screen facilitated via peering between devices in wireless communication networks in accordance with one or more embodiments described herein. Repetitive description of like elements employed in other embodiments described herein is omitted for sake of brevity.

FIGS. 7 and 8 illustrate screen sharing from target device 108 to requesting device 102. As shown in FIG. 8, screen selection component 212 can generate a display allowing a user of the target device 108 and/or requesting device 102 to share screen information from the screen (or output device, generally) of target device 108 to the screen (or output device, generally) of requesting device 102.

As shown, in some embodiments, one or more of requesting device 102 or target device 108 can toggle or otherwise select an option at the respective device to be in shared screen mode 802 and/or shared screen mode 804, which can enable the requesting device 102 to receive a shared screen from target device 108. In various embodiments, screen sharing can be turned off or on to allow a target device to prevent unauthorized screen sharing or to prevent screen sharing at particular times (e.g., when target device is accessing bank records or other sensitive information).

In the embodiment shown in FIG. 7, target device 108 can be a laptop computer coupled to a video camera monitoring an environment of interest, for example. Output device 700 of target device 108 can display content 702 intended for display at target device 108.

Upon establishing a peering session between requesting device 102 of FIG. 8 and target device 108 of FIG. 7, requesting device 102 can receive and display information 702 from output device 700 at output device 800. In various embodiments, output device 700 and/or output device 800 can include structure and/or functionality described with reference to output device 111 and output device 106, respectively.

As shown, target device 108 can provide screen sharing to requesting device 102 of information intended for display at target device 102. In some embodiments, screen sharing can be facilitated via the protocol that can stream your screen in the International Mobile Subscriber Identity (IMSI) network and open, on the requesting device screen, a screen indicative of the screen of the target device.

In various embodiments, any number of different applications can be facilitated via screen sharing. For example, troubleshooting at target device 108 can be performed via requesting device 102 by viewing content of output device 700 of target device 108. In other embodiments, requesting device 102 can view an environment at which target device 108, and/or a camera coupled to a monitoring service to which target device 108 subscribes, is located.

Turning back to FIG. 2, memory 214 can be a computer-readable storage medium storing computer-executable instructions and/or information for performing the functions described herein with reference to peering device 104 (or a component of peering device 104). For example, memory 214 can store computer-executable instructions that can be executed by processor 216 to request a peering session, accept a request for a peering session, setup a service to which the device is subscribed for virtual access by another device, terminate a peering session, locate a nearby device configured to provide peering, pay for a subscription for peering or any number of decision-making or other types of functions executed by device 200.

Processor 216 can process computer-readable storage medium computer-executable instructions to perform one or more of the functions described herein with reference to peering device 104 (or a component of peering device).

Data storage 218 can be configured to store information accessed, received, processed and/or displayed by peering device 104 (or a component of peering device). For example, as shown in FIG. 3, data storage 218 can store profile information 300 detailing preferences for subscriptions, technical information identifying and/or about the device and/or biographical information about the device or owner of the device, authentication/login information 302 for accessing the peering service, peered devices information 306 describing the devices to which a particular requesting device or target device is peered, subscriber information indicative of one or more profiles associated with device 200 for allowing peering or establishing constraints of peering (e.g., when a device will accept peering, the types of services to which the device is subscribed and has made available for virtual access by other, requesting peering devices and/or peering service access history storing current and/or past information about time, date and/or duration of peering service access 308 by device 200.

FIG. 4 illustrates an example block diagram of a system that facilitates peering between devices in wireless communication networks in accordance with one or more embodiments described herein. Turning now to FIG. 4, shown is one embodiment of system 112. System 112 can include communication component 400, peering subscription component 402, device peering authentication component 404, device peering location component 406, device peering device 408, memory 410, processor 412 and/or data storage 414. In various embodiments, one or more of communication component 400, peering subscription component 402, device peering authentication component 404, device peering location component 406, device peering device 408, memory 410, processor 412 and/or data storage 414 can be electrically and/or communicatively coupled to one another to perform one or more functions of system 112.

Communication component 400 can transmit and/or receive information for establishment of the peering service. For example, communication component 400 can receive requests for peering and authentication information for peering and/or transmit information to target devices and/or network components for establishment of peering.

Peering subscription component 402 can manage peering subscriptions for one or more devices. For example, peering subscription component 402 can determine whether one or more devices have active peering subscriptions. As another example, peering subscription component 402 can maintain records regarding the number of times that a particular device has accessed peering services and any remaining number of accesses associated with the subscription for the peering service.

Device peering authentication component 404 can authenticate two or more devices to determine whether the two or more devices can form a peering group. By way of example, but not limitation, device peering authentication component 404 can compare an IP address and/or identifier for a particular requesting device with records stored at or accessible (e.g., over a network) by device peering authentication component to determine whether the requesting device is authentic as opposed to being an imposter device. In other embodiments, any number of other types of information can be employed for authentication (e.g., user-selected passwords).

Device peering location component 406 can identify and track location of one or more devices within a peering group, determine location of one or more candidate target devices and/or determine location of a requesting device for pairing with one or more target devices. Device peering location component 406 can determine whether handoff should be initiated for a particular device and/or the particular technologies with which particular devices that are candidates for a peering group are associated.

Device peering component 408 can peer, or generate information for peering, two or more devices in a peer group. For example, in some embodiments, device peering component 408 can determine whether to peer a requesting device and one or more target devices. Device peering component 408 can make this determination based on the identity of the target devices, the particular services requested by the requesting device, requested shared screen capability, whether a particular target device has peering activated or de-activated, the geographical location of the requesting and/or target devices, the subscription types of the requesting device and/or target device or the like.

For example, in one embodiment, a request can specify the identity of a target device of interest in some embodiments. For example, a user of a requesting device may know the identification information for another device owned by the user of the requesting device (or otherwise known to the user of requesting device) and the user of the requesting device may desire access to services to which the target device is subscribed.

In some embodiments, the request can merely specify information and/or services that the requesting device would like to access. In either case, device peering component 408 can identify one or more target devices for inclusion in a peer group with requesting device 102 in response to the request from requesting device.

Memory 410 can be a computer-readable storage medium storing computer-executable instructions and/or information for performing the functions described herein with reference to system 112 (or a component of system 112). For example, memory 410 can store computer-executable instructions that can be executed by processor 412 to perform authentication, initiate a peering session, receive a request for a peering session or the like, terminate a peering session, locate a nearby device configured to provide peering, receive payment for a subscription for peering or any number of decision-making or other types of functions executed by system 112. Processor 412 can process computer-readable storage medium computer-executable instructions to perform one or more of the functions described herein with reference to system 112 (or a component of system 112). Data storage 414 can be configured to store information accessed, received, processed and/or displayed by system 112 (or a component of system 112). For example, as shown in FIG. 4, data storage 414 can store information such as the current and/or past peering groups (and/or devices within such groups), peering usage history or patterns of one or more devices or network, billing and fee information for peering services, authentication information (e.g., passwords, login information for various devices), current and/or past locations of one or more different devices, technology associated with different devices, IP addresses and/or access point identifiers for different devices or any number of other types of information to facilitate peering.

Figure 9:
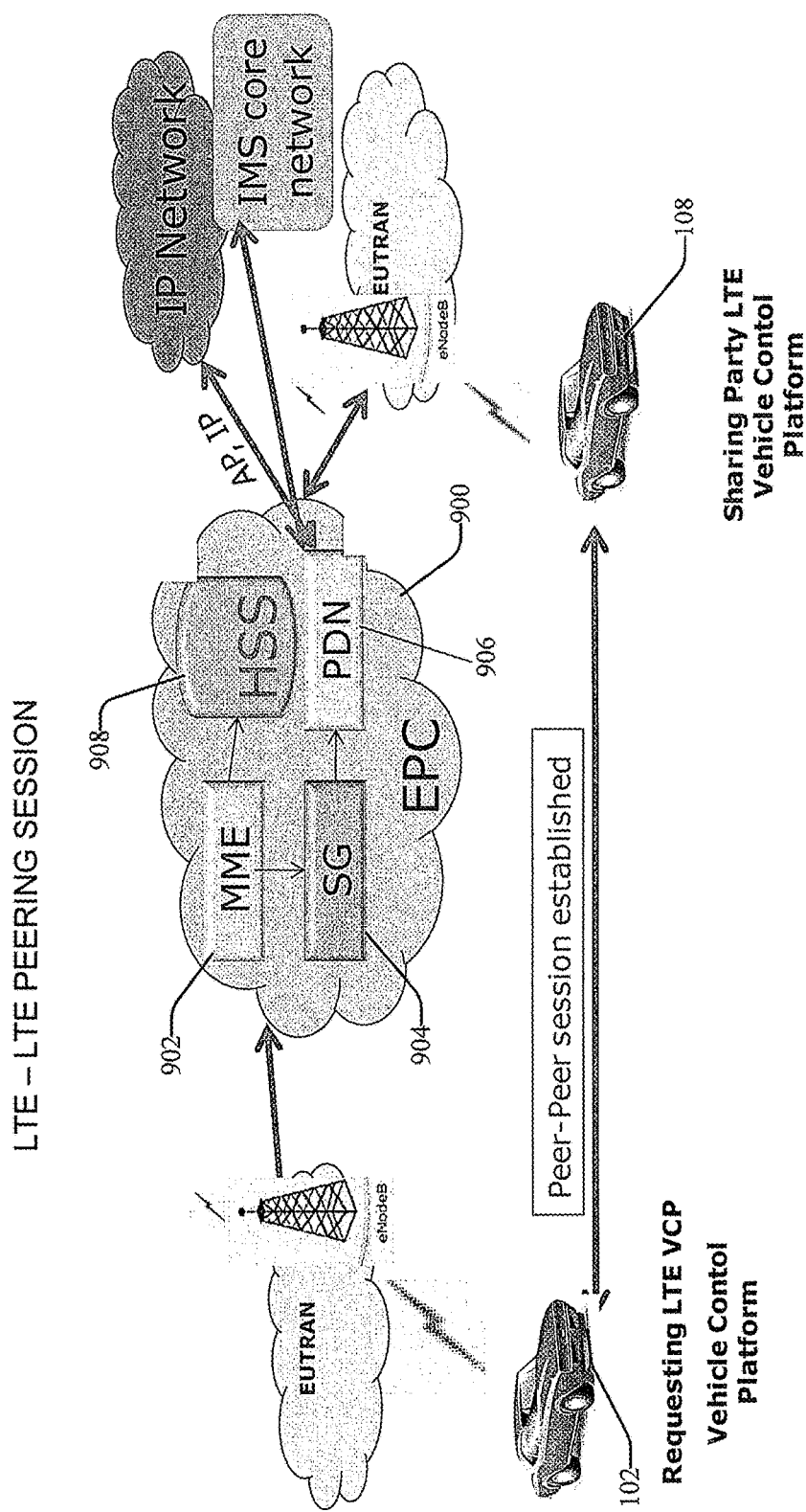
FIG. 9 illustrates an example block diagram of a system facilitating peering between devices associated with the same technology type in accordance with one or more embodiments described herein.
Figure 10:
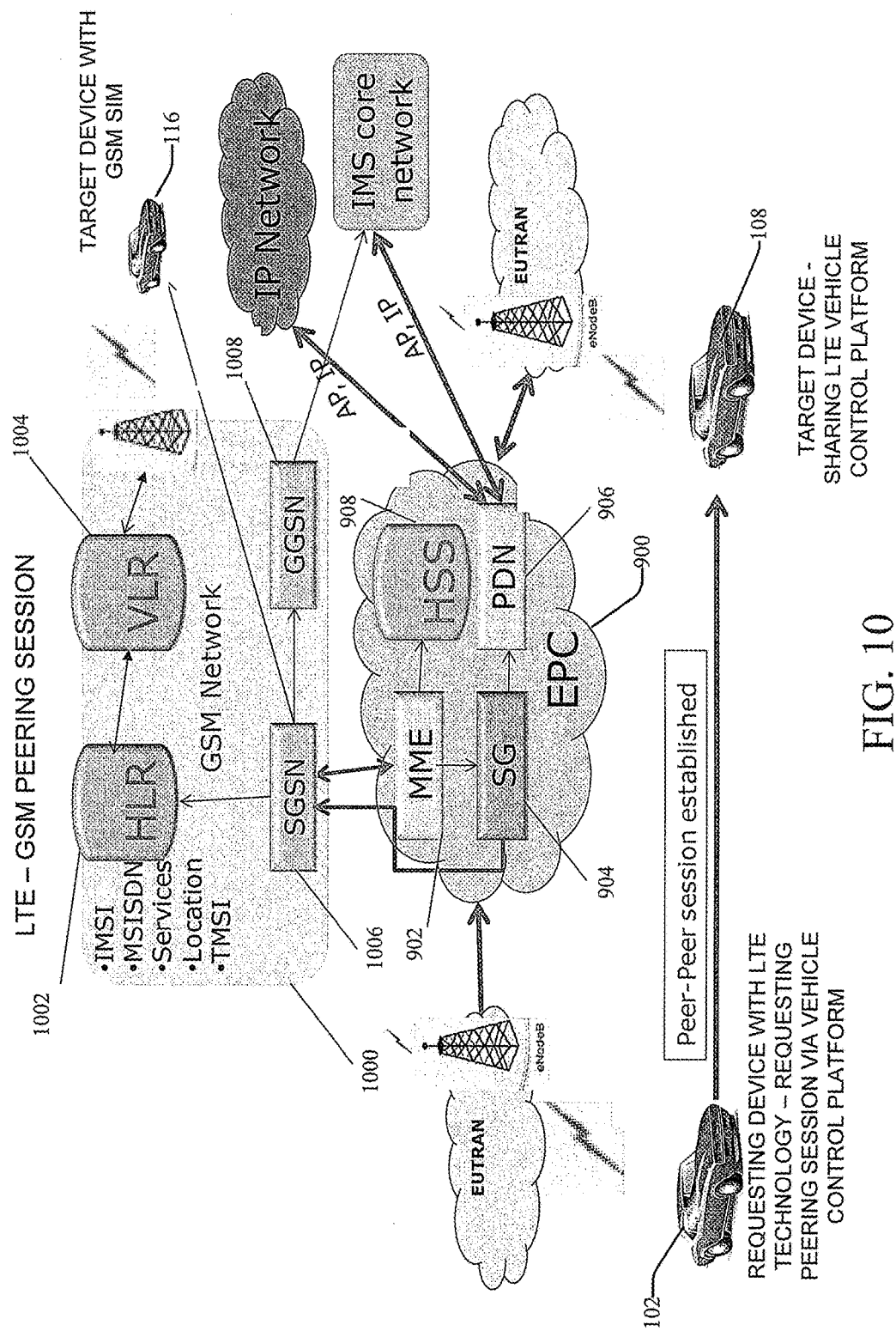
FIG. 10 illustrates an example block diagram of a system facilitating peering between devices associated with different technology types in accordance with one or more embodiments described herein.

FIG. 9 illustrates an example block diagram of a system facilitating peering between devices associated with the same technology type in accordance with one or more embodiments described herein. FIG. 10 illustrates an example block diagram of a systems facilitating peering between devices associated with different technology types in accordance with one or more embodiments described herein.

In the embodiments shown in FIGS. 9 and 10, one or more components of EPC 900 can include structure and/or functionality of that of the system 112 of FIGS. 1 and 4. As such, the embodiments illustrated in FIGS. 9 and 10 utilize components typically included in 4G systems and illustrate the method for facilitating peering between devices employing current systems. In other embodiments, system 112 of FIGS. 1 and 4 can perform one or more of the functions of the devices described with reference to FIGS. 9 and/or 10.

Turning first to FIG. 9, in the embodiment shown, peering is facilitated via an application of a vehicle control platform configured to connect two or more connectable cars. Requesting device 102 and target device 108 are included as part of connectable cars in the embodiment shown in FIG. 9. However, in other embodiments, one, neither or none of the devices are included in a vehicle and peering can be established and facilitated independent of any vehicle control platform or application of a vehicle control platform.

With reference to FIGS. 1 and 9, at step 1, requesting device 102 can request a peering session, and the request can be received by the evolved packet core (EPC) IP-based network architecture. EPC 900 can include mobile management entity (MME) 902, serving gateway (SG) 904, packet data network (PDN) 906 and/or home subscriber server (HSS) 908 typically included in an LTE wireless communication network.

Specifically, requesting device 102 is a registered device that has pre-subscribed with the connectivity service of EPC 900 to access peering. In some embodiments, the connectivity service can be an LTE and/or GSM vehicle connectivity service for connected cars in various embodiments. In some embodiments, the peering service can be a soft switching/peering service that can allow a device to create a peer network between the device and one or more other devices that have paid for a subscription to a peering service.

Requesting device 102 can be authenticated prior to allowing requesting device 102 to access the peering service. For example, when EPC 900 receives the request to initiate the peering service, EPC 900 can perform authentication of requesting device 102. For example, the authentication can be based on UICC credentials and/or IP addresses (e.g., static addresses or dynamic addresses) assigned to requesting device 102 by PDN 906. In embodiments in which requesting device 102 is included as part of a connected car, a vehicle control platform for requesting device 102 can be authenticated by PDN 906.

EPC 900 can identify a target device that is either identified in the request from requesting device 102 and/or can offer the services and/or shared screen information that requested by requesting device 102. In the embodiment shown, target device 108 is selected by EPC 900.

Target device 108 can be notified by EPC 900 of selection for peering in any number of different ways including, but not limited to, receiving a pop up or other message on an output device (e.g., display device) of target 108.

Upon accepting the session request, the target device 108 and requesting device are established as a peering group. EPC can monitor the peering session and/or control the sharing of data between target device 108 and requesting device 102.

Prior to setting up the peering session, EPC 900 performs a number of steps depending on whether requesting device 102 and target device 108 are within the same network and therefore employing the same technology. For example, in embodiments in which requesting device 102 and target device 108 are within the same network and therefore employing the same technology, the device identifier and/or other 3G or 2G information can be employed for authentication. By way of example, but not limitation, requesting device 102 can be a 3G device peering with a target device with an LTE subscriber identity module (SIM) card. As such, MME 902 can obtain subscriber profile information and attempt to determine if there is any SIM card that indicates the peering service exists for both the requesting and the target device. MME 902 can control assignment of the IP address of target device 108 to requesting device 102 in cases in which services are to be provided via target device 108.

HSS 908 can include advanced home location register (HLR) features such as like multi-IMSI and/or multi-Mobile Subscriber ISDN Number (MSISDN) features and/or can support VoLTE service and/or IMS service delivery over LTE networks. As such, HSS 908 can manage multi-device, multi-SIM, multi-IMSI and/or multi-identity scenarios. HSS 908 can map subscription information of requesting device 102 and target device 108 having peering capabilities, authenticate requesting device 102 to use the registered services of target device 108 and/or share screens with target device 108 during a peering session.

In various embodiments, HSS 908 can manage peering in multi-device embodiments as described between requesting device 102 and any number of other target devices. HSS 908 can also manage peering in multi-identity cases in which peering is provided between two or more devices owned by different users. HSS 908 can also manage peering in multi-IMSI cases to facilitate screen sharing while two or more devices are peered with one another.

EPC 900 can also perform tracking of the session and/or determination of the location of requesting device 102 and target device 108. In some embodiments, target device 108 can be passive and merely provide the service to or share screen information with requesting device 102. In other embodiments, target device 108 can also receive a service from and/or share a screen with requesting device 102.

MME 902 can route requesting device 102 to the desired destination (e.g., desired service) via target device 108. SG 904 can manage the LTE handovers. For example, when the device moves across a base station (e.g., eNodeB) in the E-UTRAN, SG 904 can serve as a local mobility anchor such that packets are routed through SG 904 for intra E-UTRAN mobility and mobility with other technologies that are different from LTE technology (e.g., for 2G/GSM and/or 3G/UMTS technologies).

Turning now to FIG. 10, FIG. 10 illustrates an example block diagram of a systems facilitating peering between devices associated with different technology types in accordance with one or more embodiments described herein.

In this embodiment, to establish a peering session, since requesting device 102, and target devices 108, 116 are of different types, signals must be sent between the networks for the two devices. For example, the network for the technology associated with requesting device 102 must be exited and the network for the technology associated with target device 108 must be entered to establish the peering session.

In this case, authentication is performed between the two networks as a coordinated effort. After the network authenticates requesting device 102 and target devices 108, 116, when an IP address is assigned for target devices outside of the network in which requesting device 102 is located (e.g., in this case, target device 116), the network allows communication with the external IP network because such communication requires an IP address. The IP address can be assigned by the SG shown in FIG. 10. The device identifier and the IP address can be provided for the authentication in some embodiments.

Peering is established between requesting device 102 and target devices 108. As such, requesting device 102 can remotely/virtually access data, control, applications, browser, screen of sharing device and/or connect to the external IP network. In various embodiments, by virtue of peering, the peered devices can share, borrow profile, controls, screens and/or cellular services.

Communication can be provided between the SG and a second target device (e.g., target device 116) to provide a peering group composed of requesting device 102 and target devices 108, 116. As such, each of requesting device 102 and target devices 108, 116 are connected to one another and can virtually access services subscribed to by any other device in the peering group and, if authorized, can share screens with any other device in the peering group.

In this embodiment, target device 116 is a different type of technology from requesting device 102. As such, EPC 900 can communicate with GSM network 1000 if target device 116 is associated with GSM network 1000. In particular, serving general packet radio service support node (SGSN) 1006 can employ information about target device 116 stored in home location register (HLR) 1002 and/or visitor location register (VLR) 1004 (e.g., target device 116 identifier and/or IP address for target device 116) to perform authentication of target device 116. Gateway GPRS 1008 can perform functions for interworking between the GPRS network and external packet-switched networks.

After authentication is performed, SGSN 1006 can also handle packet switched data within GSM network 1000 transmitted between target device 116 and one or more of requesting device 102 and/or target device 108. In some embodiments, GSM network 1000 can include a database that indicates the devices associated with GSM network 1000 that have paid subscriptions for the peering service.

SGSN can communicate with one or more components of EPC 900 to confirm authentication of target device 116 to commence with establishment of the peering session by EPC 900.

Accordingly, FIG. 10 illustrates how multiple devices can be included in a peering group notwithstanding different devices within the peering group are associated with different technologies. For example, requesting device 102 can connect to the IP network through and after peering with target device 108. Requesting device 102 then connects to multiple target devices through the IP network. As such, this embodiment can be employed for facilitation of sharing or broadcasting information from requesting device 102 to target device 116 and/or target device 108 (or broadcasting or sharing screens or services with any number of devices that may be include the entire peering group).

Figure 11:
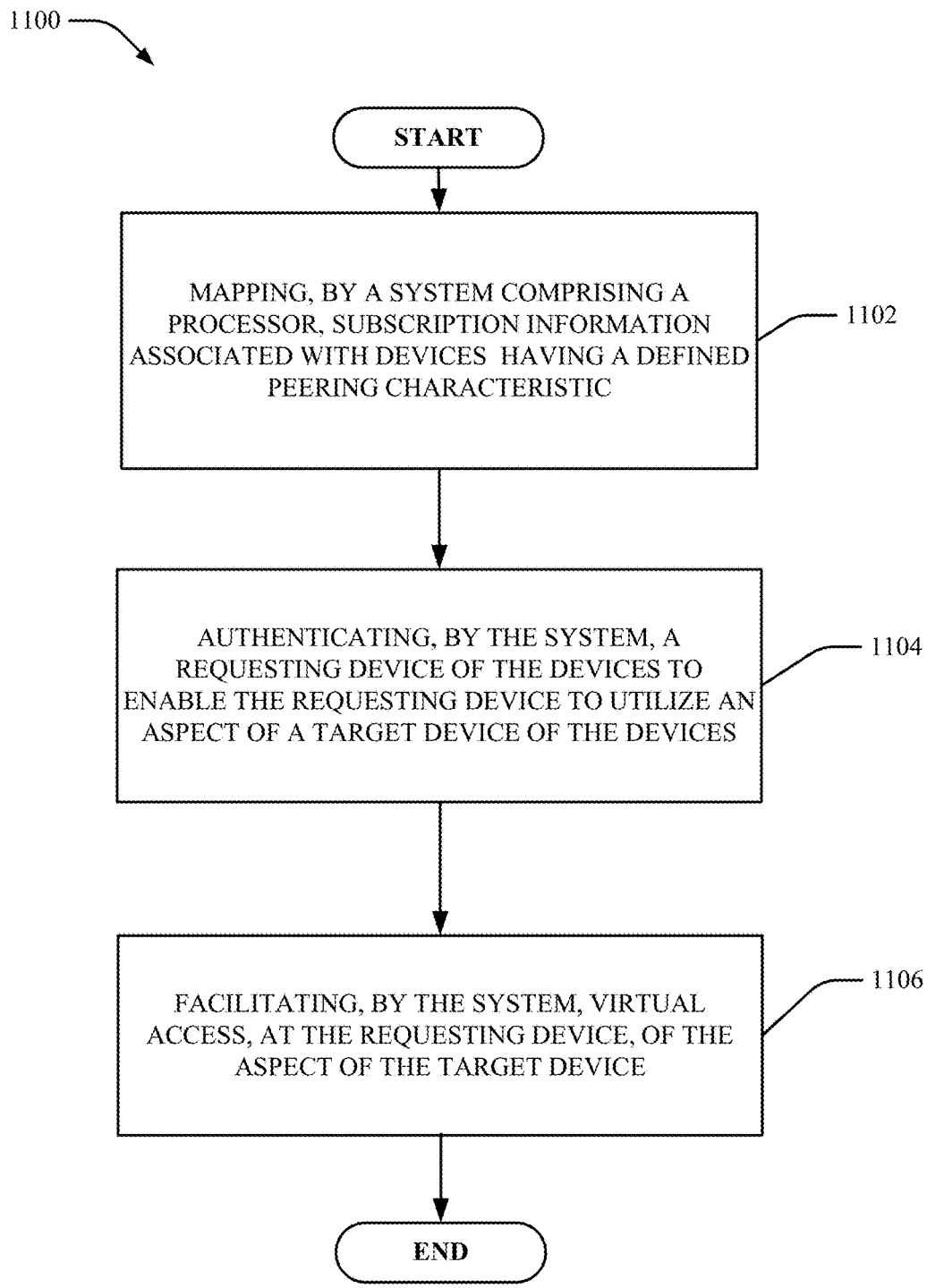
FIGS. 11 and 12 illustrate example flowcharts of methods that facilitate peering between devices in wireless communication networks in accordance with one or more embodiments described herein.
Figure 12:
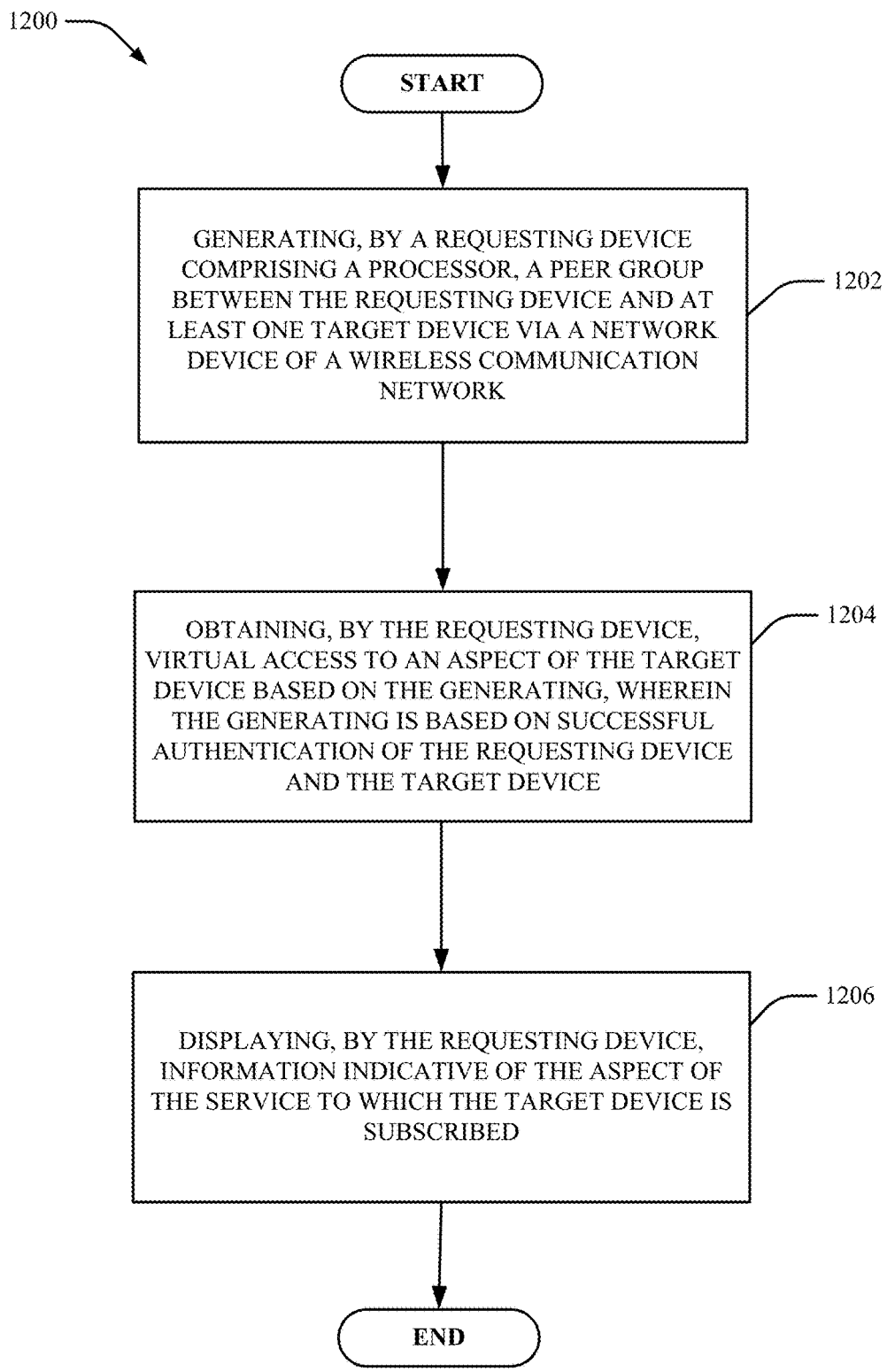

FIGS. 11 and 12 illustrate example flowcharts of methods that facilitate peering between devices in wireless communication networks in accordance with one or more embodiments described herein. Turning first to FIG. 11, at 1102, method 1100 can include mapping, by a system including a processor, subscription information associated with devices having a defined peering characteristics.

The system can receive a request to establish a peering session from a device connected to the wireless communication network. The system can map the subscription information for the requesting device as well as for a target device that will be included in the peer group with the requesting device. Mapping the subscription information can include, but is not limited to, identifying subscriptions and corresponding devices that meet requirements of a requesting device. For example, the requesting device may request peering service with a target device that has a navigation service that the requesting device can utilize via peering.

Subscription information can include, but is not limited to, information indicative of whether a particular device has subscribed to peering service allowing the device to participate in peering with one or more other devices over a wireless communication network. For example, a first device can have a paid subscription to a service that allows the first device to peer with one or more other devices that also have paid subscriptions to the peering service.

In some embodiments, a subscription can be associated with one device. In other embodiments, a subscription can be associated with multiple devices associated with a single user. As such, one or more devices associated with the same or different users can have associated subscriptions for peering.

At 1104, method 1100 can include authenticating, by the system, a requesting device of the devices to enable the requesting device to utilize an aspect of a target device of the devices. In some embodiments, the authentication is performed based on the IP address and/or the identifier for the device. After confirming the IP address and/or the identifier for the requesting device and target device are accurate and are associated with paid current subscription, the requesting device and the target device are considered authenticated by the system.

At 1106, method 1100 can include facilitating, by the system, virtual access, at the requesting device, of the aspect of the target device. For example, in some embodiments, the system can transmit information to the requesting device and/or the target device informing one or more of the devices of successful authentication and/or information for peering (e.g., password to a peering service). For example, if the requesting device and the target device are vehicles, the requesting device and/or target device can receive a password for access to the vehicle control platform such as that included in connected cars. The password can allow the requesting device and the target device to connect to one another over the wireless communication network. The requesting device can have virtual access to one or more services and/or the screen information of the target device.

Turning now to FIG. 12, at 1202, method 1200 can include generating, by a requesting device comprising a processor, a peer group between the requesting device and at least one target device via a network device of a wireless communication network. In various embodiments, the requesting device can specify a particular identity of a target device of interest and/or specify services or information that the requesting device would like to virtually access via peering with another device.

Based on the specification by the requesting device, an intermediary device capable of identifying one or more devices in the wireless communication network can identify a particular device that matches the device identity, services and/or information requested by the requesting device. After authentication of the requesting device and/or the target device and/or determination that the requesting device and/or target device are authorized to utilize the peering service, requesting device and/or target device can receive information and/or access for peering. For example, in one embodiment, requesting device and/or target device can receive a password to access a peer-to-peer communication path with one another over the wireless communication network.

In some embodiments, if both devices are part of connected cars, the communication path can be facilitated by a vehicle control platform application such as that provided in connected cars for communication between vehicles. In other embodiments, the devices can access an application stored on or accessible by the device over the wireless communication network that allows the devices to set up a peer-to-peer communication path.

While peer-to-peer communication paths are described, in other embodiments, the requesting device can form a peer group with multiple target devices simultaneously. Each of the devices in the peer group can access information from the other devices and/or share screens, etc. As such, in some embodiments, a one-to-one communication path can be formed and, in other embodiments, a communication path having three or more devices able to access the communication path can be formed.

At 1204, method 1200 can include obtaining, by the requesting device, virtual access to an aspect of the target device based on the generating, wherein the generating is based on successful authentication of the requesting device and the target device. For example, after authentication, the application that facilitates communication between the devices in the peer group can also facilitate transfer of information, images, audio services or the like between the devices. In some embodiments, for example, the requesting device can view the information intended for display on the screen or other output device of the target device. In this embodiment, troubleshooting can be performed by allowing a user of the requesting device access to the contents of the output device (e.g., screen) of the target device. As another example, a user of a requesting device can view a home, business or other environment based on the target device being associated with and connected to a camera that can record the environment. As such, a user of the requesting device can ensure that his/her home, business or other environment is undisturbed by viewing such environments over the wireless communication network.

At 1206, method 1200 can include displaying, by the requesting device, information indicative of the aspect of the service to which the target device is subscribed. In some embodiments, the requesting device can access a particular service of interest to which the target device has a subscription and the service can be displayed at and/or controlled by the requesting device. For example, the requesting device can access the Internet, navigation or other service to which the target device is subscribed without need for the user of the requesting device to subscribe the requesting device.

The requesting device and target device can be in locations remote from one another in various embodiments including, but not limited to, on different continents, in different countries or other regions that may have different wireless communication networks. For example, embodiments described herein can take advantage of handshaking between the different wireless communication networks to facilitate peer groups across the different wireless communication networks. As such, requesting device can be communicatively coupled to one wireless communication network and the target device can be communicatively coupled to another wireless communication network and embodiments described herein can allow a peer group between the two devices to be formed across the different wireless communication networks. A requesting device in the United States can view news programming or access another service that originates from a country outside of the United States (e.g., a requesting device in Hoboken, Ga. can view news programming or access another service that originates from Paris, France).

In some embodiments, requesting device and target device can be communicatively coupled to the same wireless communication network. One or both of the devices can be stationary or mobile in various embodiments.

Figure 13:
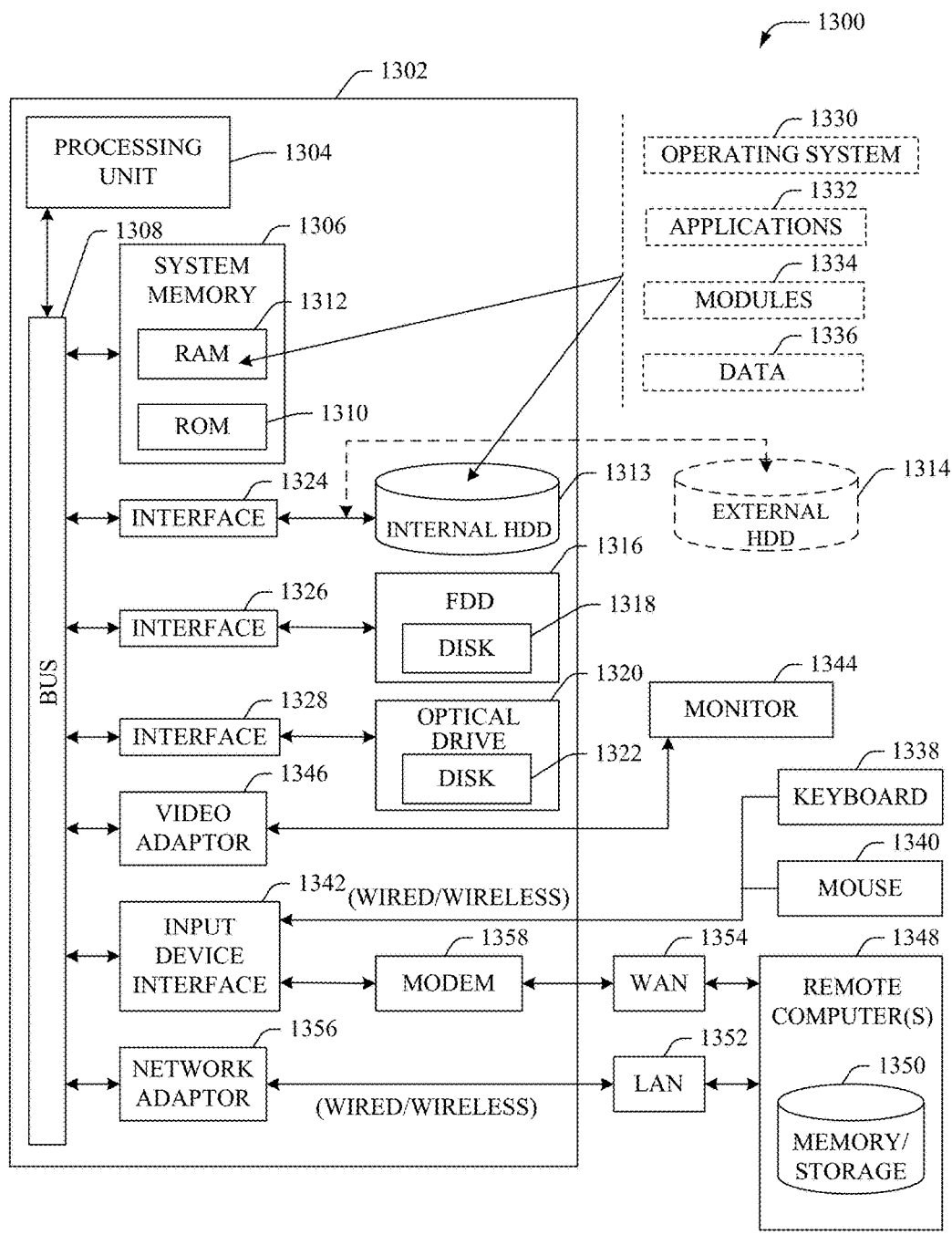
FIG. 13 illustrates a block diagram of a computer operable to facilitate peering between devices in wireless communication networks in accordance with one or more embodiments described herein.

FIG. 13 illustrates a block diagram of a computer operable to facilitate peering between devices in wireless communication networks in accordance with one or more embodiments described herein. For example, in some embodiments, the computer can be or be included within any number of components described herein including, but not limited to, peering device 104 (or components of peering device 104) and/or system 112 (or components of system 112).

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multiprocessor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1313 (e.g., EIDE, SATA), which internal hard disk drive 1313 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface, respectively. The interface 1324 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A mobile device can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of output device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless AP disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
mapping, by a system comprising a processor, subscription information associated with devices of a wireless communication network having a defined peering characteristic;
authenticating, by the system, a requesting device of the devices to enable the requesting device to utilize an aspect of a target device of the devices; and
facilitating, by the system, virtual access, at the requesting device, of the aspect of the target device based on the authenticating and based on determining that an activation has taken place at the target device of a service to which the requesting device has requested virtual access, wherein the requesting device comprises a first on and off peering switch and the target device comprises a second on and off peering switch and a service switch, wherein peering is activated based on the first on and off peering switch being turned on at the requesting device, and the second on and off peering switch and being turned on and the service switch being turned on at the target device, wherein the requesting device is geographically located on a first continent and the target device is geographically located on a second continent different from the first continent, and wherein the defined peering characteristic comprises an authorization to participate in a peering service between the devices, and wherein the authorization is associated with a paid subscription for the peering service.

2. The method of claim 1, wherein the aspect of the target device comprises the service to which the target device is subscribed.

3. The method of claim 2, wherein the service shares data retrieved from a location of the target device with the requesting device.

4. The method of claim 1, wherein the service originates from the second continent.

5. The method of claim 1, wherein the aspect of the target device comprises information for display on a first output device of the target device.

6. The method of claim 5, further comprising:
facilitating, by the system, display of the information on a second output device of the requesting device.

7. The method of claim 5, wherein the requesting device and the target device are mobile devices.

8. A method, comprising:
generating, by a requesting device comprising a processor, a peer group between the requesting device and a first target device via a network device of a wireless communication network; and
obtaining, by the requesting device, virtual access to an aspect of the first target device based on the generating, wherein the generating is based on successful authentication of the requesting device and the first target device, based on peering being determined to have been activated at the target device and based on a service requested via the virtual access and to which the first target device is subscribed being determined to have been activated at the target device, wherein the target device is configured to activate or deactivate the peering and the service, wherein the requesting device comprises a first peering switch and the first target device comprises a second peering switch, wherein the first target device further comprises a service switch, and wherein peering is activated based on the first peering switch being turned on at the requesting device, and the second peering switch and the service switch being turned on at the first target device, wherein the requesting device is geographically located on a first continent and the target device is geographically located on a second continent different from the first continent, and wherein the defined peering characteristic comprises an authorization to participate in a peering service between devices of a wireless communication network, wherein the devices comprise the requesting device and the target device, and wherein the authorization is associated with a paid subscription for the peering service.

9. The method of claim 8, wherein the aspect of the first target device comprises the service to which the first target device is subscribed, and the method further comprises:
displaying, by the requesting device, information indicative of the aspect of the service to which the first target device is subscribed.

10. The method of claim 9, wherein the service shares data with the requesting device that was retrieved from a location of the first target device.

11. The method of claim 8, wherein the aspect of the first target device comprises content for display on a first output device of the first target device.

12. The method of claim 11, wherein the requesting device and the first target device share the content and wherein the content for display via the first output device of the first target device is also displayed via a second output device of the requesting device.

13. The method of claim 8, wherein the first target device comprises a camera coupled to the network device and configured to record an event at a location of the camera, and wherein the requesting device is configured to receive information indicative of the recorded event based on the virtual access.

14. The method of claim 8, wherein the requesting device and the first target device are associated with respective paid subscriptions for a mobile device peering service.

15. The method of claim 8, wherein the peer group comprises the requesting device, the first target device and a second target device, and wherein the requesting device is configured to further obtain the virtual access to another aspect of the second target device based on authentication with the second target device forming a one-to-many communication path.

16. A non-transitory machine-readable storage medium, comprising executable instructions that, when executed by a processor, facilitate performance of operations, comprising:
generating a peer-to-peer communication path between the requesting device and a target device; and
obtaining virtual access to an aspect of the target device based on the generating, wherein the generating is based on successful authentication of the requesting device and the target device and based on activation of a device at the target device being determined to have occurred, and wherein the activation of the device results in access to a service to which the requesting device has requested the virtual access, wherein the requesting device has a first on and off peering switch and the target device has a second on and off peering switch and a service switch, and wherein peering is activated based on the first on and off peering switch being turned on at the requesting device, the service switch being turned on at the target device and the second on and off peering switch being turned on at the target device, wherein the requesting device is geographically located on a first continent and the target device is geographically located on a second continent different from the first continent, and wherein the defined peering characteristic comprises an authorization to participate in a peering service between devices within a wireless communication network, wherein the devices comprise the requesting device and the target device, and wherein the authorization is associated with a paid subscription for the peering service.

17. The non-transitory machine-readable storage device of claim 16, wherein the aspect of the target device comprises the service to which the target device is subscribed.

\* \* \* \* \*